United States Patent [19]
Rubright

[11] 3,804,366
[45] Apr. 16, 1974

[54] COMPOSITE FLOW CONTROL DEVICE

[75] Inventor: Phillip L. Rubright, Berkeley, Mich.

[73] Assignee: Arco Industries Corporation, Detroit, Mich.

[22] Filed: June 5, 1972

[21] Appl. No.: 259,721

[52] U.S. Cl. .............................. 251/305, 264/255
[51] Int. Cl. ............................................. F16k 1/18
[58] Field of Search ................................. 264/255; 251/298–308, 358

[56] References Cited
UNITED STATES PATENTS

| | | | |
|---|---|---|---|
| 2,772,850 | 12/1956 | Eaton | 251/306 |
| 2,923,523 | 2/1960 | Taylor | 251/306 X |
| 2,867,238 | 1/1959 | Wilfert | 251/305 X |
| 3,309,448 | 3/1967 | Schilling | 264/255 X |
| 3,363,039 | 1/1968 | Nagai | 264/255 X |
| 3,595,523 | 7/1971 | Felton | 251/306 |
| 3,671,621 | 6/1972 | Fukuoka | 264/255 X |

*Primary Examiner*—Henry T. Klinksiek
*Attorney, Agent, or Firm*—Reising, Ethington & Perry

[57] ABSTRACT

A flow control device such as a valve, damper and the like for controlling flow through a duct or other flow passage and including a relatively rigid main body portion composed primarily of a first organic resin material and a sealing portion bonded to the main body portion and composed of an elastomeric material including a second organic resin. The bond between the sealing portion and main body portion is increased by mixing some of the second organic resin material with the first organic resin material. Mounting means in the form of a pivot rod is molded to the main body portion for pivotally supporting the device in a duct or the like. The device can be made by a method including steps of mixing the second organic resin in powdered form into a quantity of the first organic resin in liquid form and then pouring the mixture into a portion of a mold defining the configuration of the main body portion. Elastomeric material for the sealing portion is poured into the mold in liquid form and covers the surface of the mixture of the first organic resin and the powdered form of the second organic resin. The contents of the mold is then cured.

17 Claims, 10 Drawing Figures

COMPOSITE FLOW CONTROL DEVICE

This invention relates generally to flow control devices such as valves, dampers and the like for controlling flow through a duct or other flow passage, and is particularly concerned with a flow control device constructed of organic resin material and suitable for use in air conditioning, heating and ventilation systems of automobiles, and to a method and apparatus for manufacturing such flow control devices.

Flow control devices in the form of dampers of Butterfly-type valves are particularly suitable for controlling the flow through automobile ventilation, air conditioning and heating ducts due to the ease and speed with which such devices can be manipulated. One of the problems of such devices is that of obtaining a good seal when the flow control device is in a closed position to shut off flow through the duct controlled thereby. This problem is of course magnified when the ducts and flow control devices must be produced on a mass production basis so that economic tolerances can be maintained for both the ducts and the flow control devices commensurate with the requirements for interchangeability of the products. For large quantity production, it is of course also necessary to maintain production and material costs to a minimum.

A flow control device of this type must have a relatively rigid main body portion to which mounting means such as a pivot rod or the like can be secured, and must have a peripheral sealing portion for engagement with the inner walls of the duct being controlled by the flow control device.

The co-pending U.S. Pat. application Ser. No. of Phillip L. Rubright, Ser. No. 314,063, filed Dec. 11, 1972, now U.S. Pat. No. 3,753,547, the continuation of application Ser. No. 146,369, filed May 24, 1971, now abandoned, and assigned to the assignee of this application, discloses a flow control device having a main body portion of rigid plastic material and a sealing portion of elastomeric material on the peri-application also discloses a method of making a flow control device by confining elastomeric material in liquid state in a portion of a mold defining the configuration of the sealing portion of the device, partially curing the elastomeric material to change it to a non-liquid state, and then confining thermosetting resin in liquid state in a second portion of the mold defining the configuration of the main body portion such that the liquid resin flows into contact with the partially cured elastomeric material and simultaneously curing the resin and completing curing of the elastomeric material. The liquid elastomeric material is poured into a portion of the mold and flows into contact with a heated, removeable mold member defining the inner periphery of the elastomeric sealing portion. When the liquid elastomeric material flows into contact with the heated removeable mold member, it gels immediately to prevent the elastomeric material from leaking around the removeable mold member. The removeable mold member is then removed from the mold and liquid thermosetting resin is poured into the mold and is surrounded by the partially cured elastomer.

The present invention has for one of its primary objects the simplification of the manufacturing of this type of device by eliminating the necessity of partially curing the elastomer prior to curing the thermosetting resin so that both the elastomeric material for the sealing portion of the device and the thermosetting resin of the main body portion of the device can be simultaneously cured from a liquid state.

A further object of this invention is to provide a dual layer composite flow control device having a relatively rigid main body portion of organic resin material and an elastomeric sealing portion including organic resin material wherein the bond between the sealing portion and main body portion is increased.

In accordance with the present invention, the flow control device includes a relatively rigid main body portion or layer composed of a first organic resin material and a sealing portion or layer overlying the main body portion, and projecting from the periphery thereof, the sealing portion being composed of elastomeric material including a second organic resin. The bond between the main body portion and the sealing portion is increased by mixing a powdered form of the second organic resin with the first organic resin. The first organic resin may be a thermosetting epoxy resin and the main body portion formed thereby may include a plurality of openings or the like so that the main body portion comprises a grid-work or frame for supporting the continuous elastomeric sealing portion. That is to say, the elastomeric sealing portion will overlie one side of the frame or grid-work making up the body portion and will extend across the openings in the frame or grid-work. A pivot rod is embedded in the body portion for pivotally mounting the device in a duct or the like.

In the manufacture of the flow control device, the first organic resin in liquid form, such as thermosetting epoxy resin, has mixed therewith a selected quantity of a second organic resin, such a polyvinyl chloride, in powdered form. The mixture is confined in a portion of a mold defining the configuration of the body portion of the flow control device, and a pivot rod is placed on the mold such that a portion of the pivot rod is immersed in the liquid mixture. A plastisol containing the second organic resin, for example, a vinyl plastisol, is then poured in liquid form into the mold and covers the surface of the mixture of the first organic and the powdered form of the second organic resin. The mold and the entire contents are then placed in a curing oven or the like to cure the contents of the mold and solidify the plastisol and the first organic resin.

Other objects, advantages and features of the invention will become apparent from the following description given in connection with the accompanying drawings in which.

Figure 1:
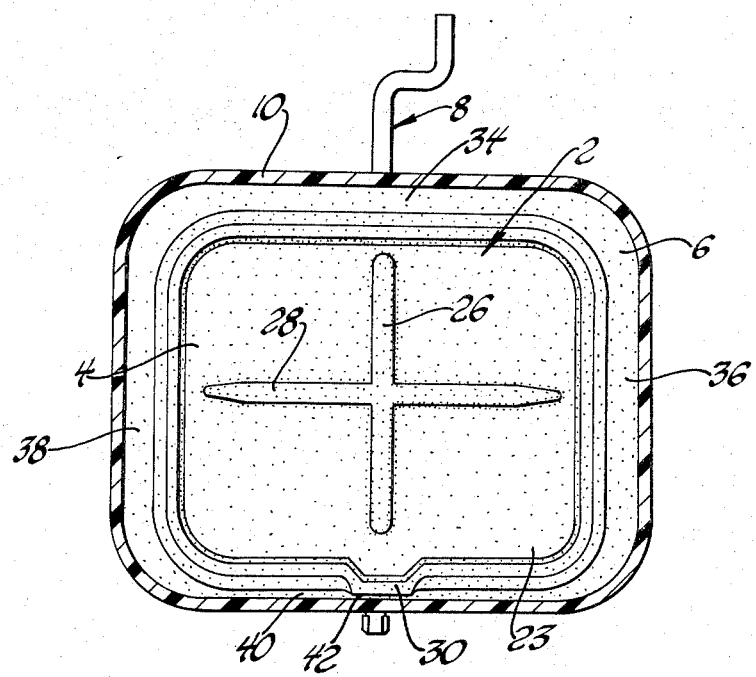
FIG. 1 is a cross-sectional view of a duct having flow control device according to the invention mounted therein.
Figure 2:
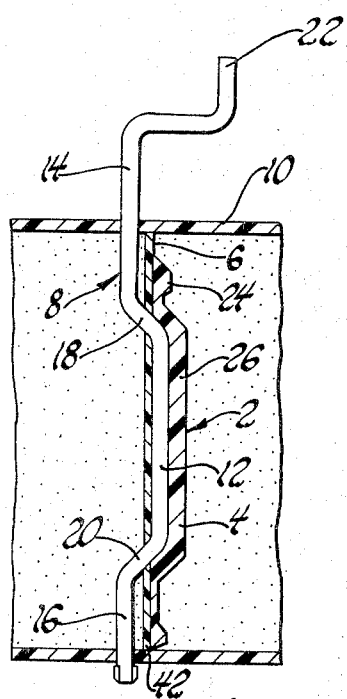
FIG. 2 is a sectional view taken on line 2—2 of FIG. 1.

In FIG. 1 and 2, reference numeral 2 collectively designates a flow control device according to the invention having a relatively rigid body portion 4 composed primarily of organic resin material such as thermosetting epoxy resin, and an elastomeric sealing portion 6 bonded to the body portion 4 and projecting outwardly from the periphery thereof to define a sealing edge for the flow control device 2. As shown in FIGS. 1 and 2, the sealing portion 6 comprises one layer of the dual-layer flow control device that extends across one entire surface of the body portion 4 and also projects beyond the edges thereof. Mounting means 8 for ppivotably mounting the flow control device 2 in a duct 10 comprises a rod molded to or imbedded in the body portion 4.

The rod 8 has a central portion 12 embedded in the material of the body portion 4, and offset end portions 14 and 16 on the central portion both of which project from one side of the body portion 4 and through openings in the wall of the duct 10 for pivotally mounting the flow control 2 in the duct. The central portion 12 has outwardly bent portions 18 and 20 projecting from the main body portion 4, the end portions 14 and 16 extending respectively from the bent portions 18 and 20. A crank arm 22 is formed on the end portion 14 for connection with a cable or similar operating means.

The body portion 4 of the control device 2 comprises a flat disc with a peripheral flange 24 projecting from one side thereof in the direction of the axis of duct 10. A central bead 26 projects from the same side 23 of the disc forming the body portion 4, and the central portion 12 of the mounting rod 8 extends in parallel relationship with bead 26. A bead 28 extending transversly of the bead 26 is also formed on the body portion 4 and projects from side 23 thereof. A locating projection 30 is formed on the periphery of the disc or body 4 for providing vertical support of the body portion 4 in the duct 10.

In the embodiment illustrated in FIG. 1 and 2, flow control device 2 is of non-circular configuration in plan, and the width of the sealing portion 6 that projects from the periphery of the body portion 4 varies in width around the circumference of the body portion 4. The top segment 34 and sides 36 and 38 of the elastomeric sealing portion 6 are of substantially the same width, while the bottom segment 40 is of substantially the same width, while the bottom segment 40 is of substantially less width than segments 34, 36 and 38. The segment 42 of the portion of elastomeric sealing portion that projects beyond the locating projection 30 is of substantially less width than the segments 34, 36 and 38. Vertical or axial support of the control device 2 is provided by the locating projection 30, so that the entire periphery of sealing portion 6 is in good sealing engagement with the inner walls of the duct 10.

The openings in the duct 10 for the end portions 14 and 16 of the mounting rod 8 are on the downstream side of the control device 2 so that there is no likelihood of leakage through such openings on the upstream or high pressure side of the control device 2. The high pressure side is the right hand side of the control device 2 in FIG. 2 of the drawings. The end portions 14 and 16 will generally be located on the passenger compartment side of the control device 2 where it is not critical to prevent the leakage from the duct 10.

The thin portion 42 of the sealing portion 6 provides a seal beneath the locating projection 30 without a significant amount of deflection of the elastomeric portion 32, so that the upper segment 34 of the sealing portion 6 is in good sealing contact with the upper wall of the duct 10. The mounting rod 8 provides transverse support for the control device such that the side segments 36 and 38 of the sealing portion 6 are in close sealing contact with the respective side wall of the duct. Consequently, when the control device 2 is in the fully closed position illustrated in FIGS. 1 and 2, there will be no flow through the duct past the control device 2.

The body portion 4 of the control device 2 is composed primarily of a relatively rigid organic resin such as thermosetting epoxy resin. The elastomeric sealing portion 6 bonded to the body portion 4 is composed of a plastisol containing an organic resin different from the organic resin of the body portion 4. By plastisol is meant a liquid dispersion of finely divided resin in a plasticizer. It is usually 100 percent solid with no volatiles, and when the volatile content exceeds 5 percent of the total weight, it is referred to as an organosol. When the plastisol is heated, the plasticizer solvates the resin particles, and the mass gels. With continued application of heat the mass fuses to become a conventional thermoplastic material. In order to increase the bond between the body portion 4 and the sealing portion 6, the same organic resin, in powdered form that is contained in the plastisol, is mixed into the liquid organic resin that forms the body portion 4.

The control device 2 may be made by mixing polyvinyl chloride powder into liquid epoxy. It has been found that the most satisfactory results are obtained when 10 to 20 percent of polyvinyl chloride powder by weight is mixed with liquid epoxy resin. The mixture of the liquid epoxy resin and polyvinyl chloride powder is then confined in a portion of a mold defining the configuration of the body 4. The mounting rod 8 is then placed on the mold so that portion 12 is immersed in the liquid mixture of the polyvinyl chloride powder and epoxy resin. A vinyl plastisol in liquid form is then poured or "floated" over the surface of the epoxy resin to the desired thickness of the sealing portion 6. The entire contents of the mold are then cured by placing the mold into a curing oven to solidify the plastisol and epoxy resin.

Figure 3:
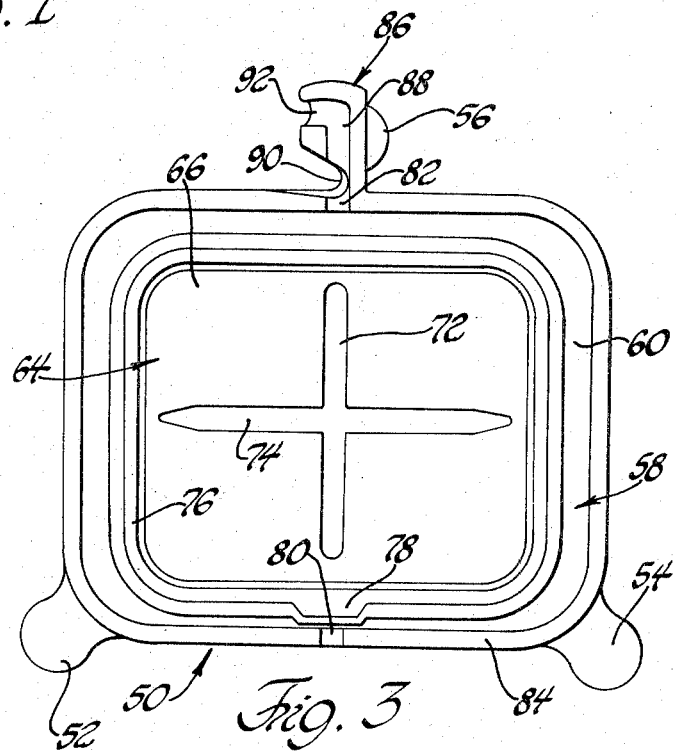
FIG. 3 is a plan view of molding apparatus for making the flow control device shown in FIGS. 1 and 2.

FIGS. 3 through 9 illustrate a molding apparatus and the various steps in the manufacturing of the control device 2. In FIG. 3, reference numeral 50 collectively designates a mold body having legs 52, 54 and 56. A cavity is formed in the mold 50 including a first mold portion 58 having a bottom surface 60 for defining one side surface of the portion of the sealing portion 6 that projects beyond the body 4, the outer periphery of the sealing portion 6 being defined by an edge surface 62 of the mold. The mold cavity includes a second mold portion 64 having a bottom surface 66 for defining one side surface of the body portion 4 of the control device 2. Transverse recesses 72 and 74 are formed in the bottom 66 of the second mold portion 64 for defining the beads 28 and 26, respectively, on the body portion 4. The mold portion 64 is also formed with a peripheral recess 76 for defining the peripheral flange 24 of the body 4.

The bottom surface of the first and second mold portions 58 and 64 are non-circular in plan, and the width of the bottom surface of the first mold portion 58 varies around the periphery of the second mold portion 64 in accordance with the configuration of the segments 34, 36, 38, 40 and 42 of the sealing portion 6 of the control device 2. The bottom surface 66 of the mold portion 64 projects outwardly as illustrated at 78 toward the edge surface of the mold portion 58 to define the locating projection of the body of 4.

Figure 4:
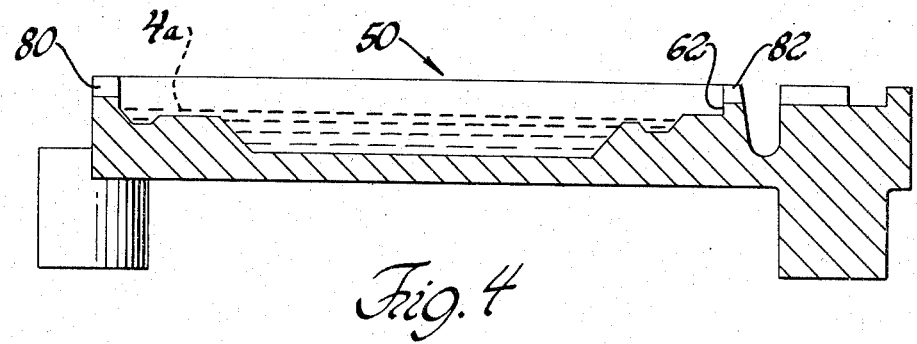
FIGS. 4 through 7 are sectional views of the molding apparatus of FIG. 3 sequentially illustrating a method of manufacturing the flow control device of FIGS. 1 and 2.
Figure 5:
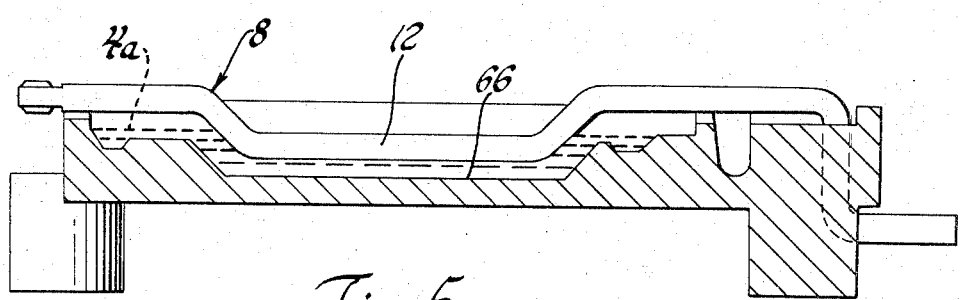

Rod supporting means are formed on the mold apparatus of FIGS. 3, 4 and 5, and include a pair of grooves 80 and 82 spaced from each other on opposite sides of the first and second mold portions, grooves 80 and 82 being formed in the rim 84 extending around the periphery of the mold body 50. The rod supporting means further includes a projection 86 extending outwardly from the rim 84 and having a rod receiving recess 88 formed therein which is in axial alignment with the grooves 80 and 82. The projection 86 includes a pair of crank arm locating slots 90 and 92 each communicating with the recess 82 for supporting the crank arm 22 of the mounting rod 8. The slot 90 is used to support a crank arm of one configuration, and slot 92 is used to support a crank arm of a second configuration, as necessary. Slots 90 and 92 angularly locate the mounting rod with the mold cavity portions 58 and 64.

Figure 6:
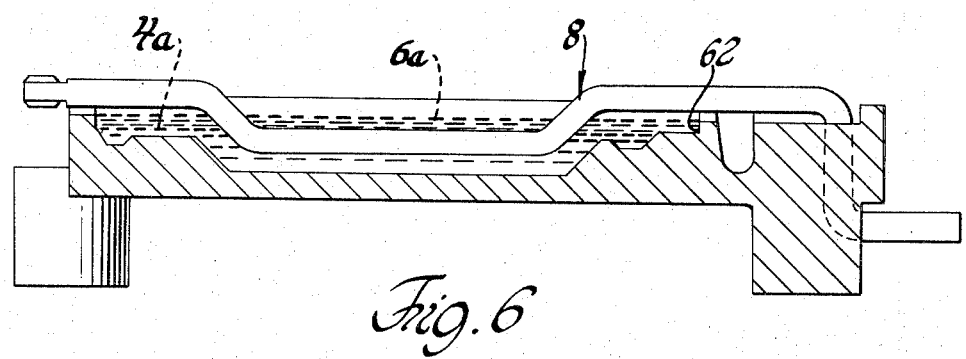
Figure 7:
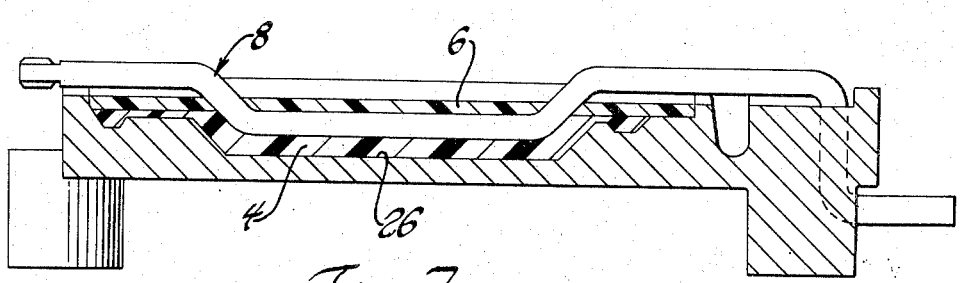

With reference to FIG. 4, the first step in the method of making the control device 2 comprises confining a mixture of liquid organic resin for the body 4 with organic resin used in the plastisol for the sealing portion 6 in powdered form in the mold as indicated in FIG. 4. The mixture is poured into the mold to the level indicated at 4a by the dotted lines, or to the level defining the surface of the body 4 to which the sealing portion 6 is to be bonded. The second step is illustrated in FIG. 5, and the mounting rod 8 is placed on the mold such that the central portion 12 of the mounting rod 8 is immersed in the mixture of the liquid and powdered organic resins. The third step is illustrated in FIG. 6, wherein the liquid plastisol containing a dispersion of the same organic resin that is mixed in powdered form with the liquid organic resin forming the body portion 4 is poured or "floated" onto the upper surface of the mixture to the depth indicated at 6a and defined by the edge portion 62 of the mold. The mold and the entire contents are then placed into a curing oven to solidify the layer forming the body portion 4 and the layer forming the sealing portion 6, as illustrated in FIG. 7.

Figure 8:
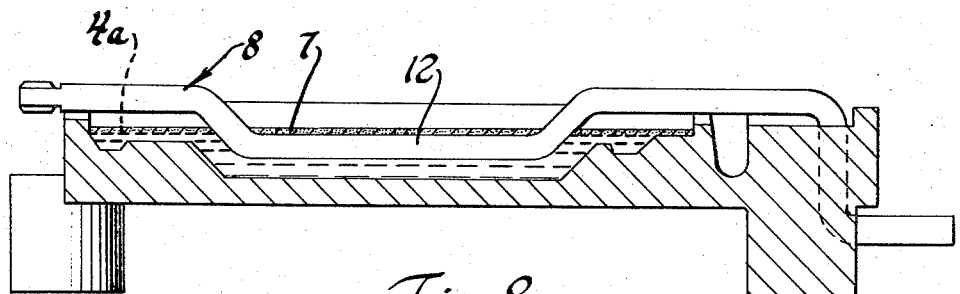
FIG. 8 is a view similar to FIGS. 4 through 7 illustrating an alternative step in the method of manufacturing the flow control device.

An alternative step in the method described in the preceding paragraph is illustrated in FIG. 8, wherein liquid epoxy resin is poured into the mold before it is mixed with the powdered resin of the plastisol. The mounting rod 8 is then placed onto the mold with the central portion 12 thereof immersed in the liquid epoxy resin. Powdered polyvinyl chloride, indicated by reference numeral 7 is then sprinkled over the surface of the liquid epoxy resin to form a mixture of liquid epoxy resin and powdered polyvinyl chloride. Vinyl plastisol is then poured or "floated" onto the surface of the epoxy, as in the previously defined step in connection with FIG. 6. The mold is then placed into a curing oven to cure the materials contained in the mold.

Figure 9:
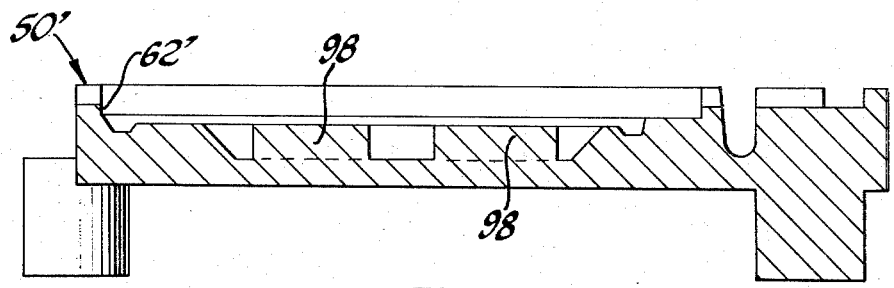
FIG. 9 is a sectional view of an alternative construction of a mold.
Figure 10:
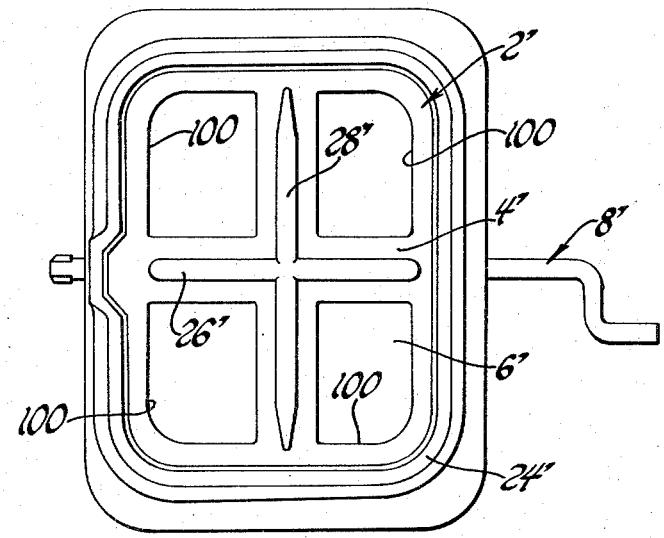
FIG. 10 is a cross-sectional view of a duct having a flow control device mounted therein and constructed according to a second form of the invention.

A modified form of the control device is illustrated in FIG. 10, wherein the control device 2 includes body portion 4' in the form of a relatively rigid framework, having a plurality of openings 100 extending therethrough. The sealing portion 6' of the control device 2' extends across one surface of the body 4' and closes the openings 100. The configuration of the body 4' can be formed in a mold as illustrated in FIG. 9, which is identical to the previously described molds, except for the addition of projections 98 extending upwardly from the bottom surface 66 of the mold to form the openings 100 through the body portion 4'. Obviously, other configurations of the body 4 can be provided by altering the mold accordingly.

While specific forms of the invention have been illustrated and described in the accompanying drawings and the foregoing specification, it will be apparent to those skilled in the art that the invention is not limited to the exact construction shown, or to the exact steps described, but that variations in the construction and method, all falling within the scope and spirit of the invention, will be apparent to those skilled in the art.

The embodiments of the invention in which an exclusive property or privilege is claimed are defined as follows:

1. A composite flow control device comprising: a relatively rigid body portion composed primarily of a first organic resin; and an elastomeric sealing portion bonded to said body portion and projecting outwardly from the periphery thereof for resilient, sealing engagement with the wall of a duct or the like, said sealing portion being composed of a material including a second organic resin, said first organic resin having said second organic resin mixed therewith to increase the bond between said main body portion and said sealing portion.

2. A device as claimed in claim 1 wherein said sealing portion is composed of vinyl plastisol, said second organic resin thus being vinyl.

3. A device as claimed in claim 2 wherein said first organic resin comprises thermosetting epoxy resin.

4. A device as claimed in claim 1 wherein said first organic resin is thermosetting epoxy resin.

5. A device as claimed in claim 4 wherein said sealing portion is composed of vinyl plastisol, said second organic resin thus being vinyl.

6. A device as claimed in claim 1 further including mounting means on said body portion for pivotally supporting the device in a duct or the like.

7. A device as claimed in claim 6 wherein said mounting means comprises a rod molded to said body portion.

8. A device as claimed in claim 7 wherein said rod has a central portion embedded in the material of said body portion, and offset end portions on said central portion which project from one side of said body portion.

9. A device as claimed in claim 8 including a crank arm formed on one of said end portions.

10. A device as claimed in claim 1 wherein said body portion comprises a flat disc with a peripheral flange projecting from one side thereof.

11. A device as claimed in claim 10 including a central bead projecting from said one side of said disc.

12. A device as claimed in claim 11 including a mounting rod having a central portion embedded in said central bead.

13. A device as claimed in claim 12 wherein said rod is formed with offset end portions extending from said central portion and projecting from one side of said disc.

14. A device as claimed in claim 13 including a locating projection formed on the periphery of said disc for providing vertical support of said disc in a duct or the like.

15. A device as claimed in claim 1 wherein said body portion includes a relatively rigid framework having a plurality of openings extending therethrough, said sealing portion overlying said openings.

16. A composite flow control device comprising: a main body portion of substantially rigid plastic material; and a sealing portion of elastomeric material bonded integrally to said main body portion, said sealing portion covering one entire side of said main body portion and projecting outwardly from the periphery of said main body portion for resilient, sealing engagement with the wall of a duct or the like.

17. A device as claimed in claim 16 wherein said main body portion is composed primarily of a first organic resin, and said sealing portion is composed of a material including a second organic resin, said first organic resin having said second organic resin mixed therewith to increase the bond between said main body portion and said sealing portion.

* * * * *